United States Patent
Beaumont et al.

(10) Patent No.: US 10,012,508 B2
(45) Date of Patent: Jul. 3, 2018

(54) PROVIDING DIRECTIONS TO A LOCATION IN A FACILITY

(71) Applicant: Lenovo (Singapore) Pte. Ltd., New Tech Park (SG)

(72) Inventors: Suzanne Marion Beaumont, Wake Forest, NC (US); Rod David Waltermann, Rougemont, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/638,542

(22) Filed: Mar. 4, 2015

(65) Prior Publication Data
US 2016/0258760 A1 Sep. 8, 2016

(51) Int. Cl.
*G01C 21/20* (2006.01)

(52) U.S. Cl.
CPC .................. *G01C 21/206* (2013.01)

(58) Field of Classification Search
CPC ....... G01C 21/20; G01C 21/206; G06T 11/60; G09B 29/106; G06F 17/30241; G06F 17/3087
USPC ................. 701/410, 428; 340/407.1; 706/47; 235/381; 705/26.41
See application file for complete search history.

(56) References Cited

U.S. PATENT DOCUMENTS

| | | | |
|---|---|---|---|
| 6,216,086 B1 | 4/2001 | Seymour et al. | |
| 6,320,496 B1 * | 11/2001 | Sokoler | G01C 21/20 340/407.1 |
| 7,574,661 B2 | 8/2009 | Matsuura et al. | |
| 2007/0015519 A1 | 1/2007 | Casey | |
| 2007/0276591 A1 | 11/2007 | Lea et al. | |
| 2008/0046176 A1 | 2/2008 | Jurgens | |
| 2008/0214157 A1 | 9/2008 | Ramer et al. | |
| 2008/0248815 A1 | 10/2008 | Busch | |
| 2009/0186628 A1 | 7/2009 | Yonker et al. | |
| 2009/0216438 A1 * | 8/2009 | Shafer | G01C 21/20 701/414 |
| 2009/0292528 A1 | 11/2009 | Kameyama | |
| 2009/0319176 A1 | 12/2009 | Kudoh et al. | |
| 2010/0023252 A1 * | 1/2010 | Mays | G01C 21/20 701/533 |
| 2010/0248745 A1 | 9/2010 | Ozawa et al. | |

(Continued)

OTHER PUBLICATIONS

Suzanne Marion Beaumont, Paul Plaskonos, Rod D. Waltermann, "Direction Assistance Based on Personal Experience", related U.S. Appl. No. 14/161,464, Final Office Action dated Dec. 15, 2015.

(Continued)

*Primary Examiner* — Nga X Nguyen
(74) *Attorney, Agent, or Firm* — John L. Rogitz; John M. Rogitz (57) ABSTRACT

In one aspect, a device includes a processor, a position receiver, and storage bearing instructions. The instructions are executable by the processor to receive from the position receiver data indicating a location of the device. The instructions are also executable to receive a map of a facility, present on the device at least a portion of the map, receive a selection of a destination indicated on the map, and at least in part based on the selection and the data indicating the location of the device, present on the device directions to the destination in the facility.

20 Claims, 7 Drawing Sheets

(56) References Cited

U.S. PATENT DOCUMENTS

| | | | |
|---|---|---|---|
| 2011/0144902 A1* | 6/2011 | Forte | G01C 21/20 |
| | | | 701/533 |
| 2011/0301835 A1 | 12/2011 | Bongiorno | |
| 2012/0130630 A1 | 5/2012 | Tang et al. | |
| 2012/0150431 A1* | 6/2012 | Ooka | G01C 21/20 |
| | | | 701/425 |
| 2012/0208559 A1 | 8/2012 | Svendsen et al. | |
| 2013/0006521 A1 | 1/2013 | Needham et al. | |
| 2013/0029685 A1* | 1/2013 | Moshfeghi | G01S 19/48 |
| | | | 455/456.1 |
| 2013/0122937 A1 | 5/2013 | Meyer et al. | |
| 2013/0127980 A1* | 5/2013 | Haddick | G06F 3/013 |
| | | | 348/14.08 |
| 2013/0217366 A1 | 8/2013 | Kolodziej | |
| 2013/0261966 A1 | 10/2013 | Wang et al. | |
| 2013/0321257 A1* | 12/2013 | Moore | G06F 3/0481 |
| | | | 345/156 |
| 2014/0018106 A1 | 1/2014 | Fulger et al. | |
| 2014/0057657 A1 | 2/2014 | Manber et al. | |
| 2014/0082062 A1 | 3/2014 | Bellver et al. | |
| 2014/0214267 A1 | 7/2014 | Sellschopp | |
| 2015/0193819 A1 | 7/2015 | Chang | |

OTHER PUBLICATIONS

Suzanne Marion Beaumon, Paul Plaskonos, Rod D. Waltermann, "Direction Assistance Based on Personal Experience" file history of related U.S. Appl. No. 14/161,464, filed Jan. 22, 2014.

Suzanne Marion Beaumont, Paul Plaskonos, Rod D. Waltermann, "Direction Assistance Based on Personal Experience", related U.S. Appl. No. 14/161,464, Non-Final Office Action dated Jul. 6, 2015.

Suzanne Marion Beaumont, Paul Plaskonos, Rod D. Waltermann, "Direction Assistance Based on Personal Experience", related U.S. Appl. No. 14/161,464, Applicant's response to Non-Final Office Action filed Jul. 23, 2015.

Suzanne Marion Beaumont, Paul Plaskonos, Rod D. Waltermann, "Direction Assistance Based on Personal Experience", related U.S. Appl. No. 14/161,464, Non-Final Office Action dated Oct. 6, 2015.

Suzanne Marion Beaumont, Paul Plaskonos, Rod D. Waltermann, "Direction Assistance Based on Personal Experience", related U.S. Appl. No. 14/161,464, Applicant's response to Non-Final Office Action filed Oct. 21, 2015.

Suzanne Marion Beaumont, Paul Plaskonos, Rod D. Waltermann, "Direction Assistance Based on Personal Experience", related pending U.S. Appl. No. 14/161,464, applicants response to final office action filed Feb. 18, 2016.

Suzanne Marion Beaumont, Paul Plaskonos, Rod David Waltermann, "Direction Assistance Based on Personal Experience", related U.S. Appl. No. 14/161,464, Non-Final Office Action dated Apr. 8, 2016.

Suzanne Marion Beaumont, Paul Plaskonos, Rod D. Waltermann, "Direction Assistance Based on Personal Experience", related pending U.S. Appl. No. 14/161,464, applicant's response to non-final office action filed Jul. 6, 2016.

Suzanne Marion Beaumont, Paul Plaskonos, Rod D. Waltermann, "Direction Assistance Based on Personal Experience", related U.S. Appl. No. 14/161,464, Applicant's response to Non-Final Office Action filed Dec. 27, 2016.

Suzanne Marion Beaumont, Paul Plaskonos, Rod D. Walterman, "Direction Assistance Based on Personal Experience", related U.S. Appl. No. 14/161,464, Non-Final Office Action dated Oct. 14, 2016.

Suzanne Marion Beaumont, Paul Plaskonos, Rod D. Waltermann, "Direction Assistance Based on Personal Experience", related U.S. Appl. No. 14/161,464, Final Office Action dated Apr. 14, 2017.

Suzanne Marion Beaumont, Paul Plaskonos, Rod D. Waltermann, "Direction Assistance Based on Personal Experience", related pending U.S. Appl. No. 14/161,464, applicant's response to final office action filed Jul. 11, 2017.

* cited by examiner

PROVIDING DIRECTIONS TO A LOCATION IN A FACILITY

FIELD

The present application relates generally to providing directions to a location in a facility.

BACKGROUND

Often times, people enter buildings with which they are unfamiliar. This makes navigating to a desired destination within the building difficult, confusing, and frustrating. Even when signs are placed in these buildings, the signs are not always clear and can lead to further confusion and frustration.

SUMMARY

Accordingly, in one aspect, a device includes a processor, a position receiver, and storage bearing instructions. The instructions are executable by the processor to receive from the position receiver data indicating a location of the device. The instructions are also executable to receive a map of a facility, present on the device at least a portion of the map, receive a selection of a destination indicated on the map, and at least in part based on the selection and the data indicating the location of the device, present on the device directions to the destination in the facility.

In another aspect, a method includes receiving from a position receiver data indicating a location of a device, receiving a map of a facility, presenting on the device at least a portion of the map, receiving a selection of a destination indicated on the map, and, at least in part based on the selection and the data indicating the location of the device, presenting, on the device, directions to the destination in the facility.

In still another aspect, a device includes at least one processor, a position receiver accessible to the processor, and memory accessible to the processor. The memory bears instructions executable by the processor to receive from the position receiver data indicating a location of the device, receive from a kiosk that has stored data pertaining to a destination in a building information comprising directions to the destination in the building, and at least in part based on the information from the kiosk, present on the device at least one direction to the destination in the building.

The details of present principles, both as to their structure and operation, can best be understood in reference to the accompanying drawings, in which like reference numerals refer to like parts, and in which:

DETAILED DESCRIPTION

This disclosure relates generally to device-based information. With respect to any computer systems discussed herein, a system may include server and client components, connected over a network such that data may be exchanged between the client and server components. The client components may include one or more computing devices including televisions (e.g. smart TVs, Internet-enabled TVs), computers such as desktops, laptops and tablet computers, so-called convertible devices (e.g. having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or other browser program that can access web applications hosted by the Internet servers over a network such as the Internet, a local intranet or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by e.g. a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g. that may not be a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

"A system having one or more of A, B, and C" (likewise "a system having one or more of A, B, or C" and "a system having one or more of A, B, C") includes systems that have A alone, B alone, C alone, A and B together, A and C together, B and C together, and/or A, B, and C together, etc.

The term "circuit" or "circuitry" is used in the summary, description, and/or claims. As is well known In the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Figure 1:
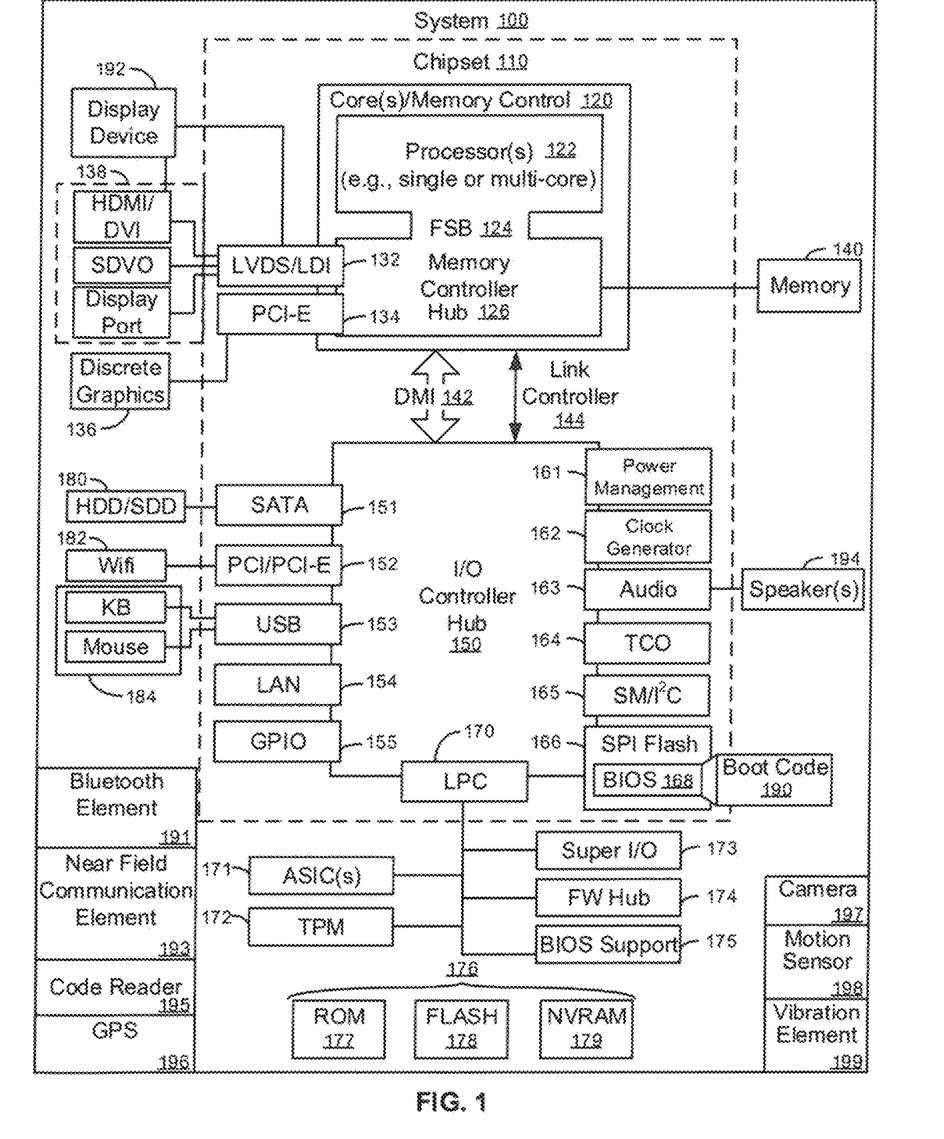
FIG. 1 is a block diagram of an example system in accordance with present principles.

Now specifically in reference to FIG. 1, it shows an example block diagram of an information handling system and/or computer system 100. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be e.g. a game console such as XBOX® or Playstation®.

As shown in FIG. 1, the system 100 includes a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 further includes a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, fee memory controller hub 126 may include a 16-lane (x16) PCI-E port for an external PCI-E based graphics card (including e.g. one of more GPUs). An example system may include AGP or PCI-E for support of graphics.

The I/O hub controller 150 includes a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc, under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 provide for communication with various devices, networks, etc. For example, the SATA interface 151 provides for reading, writing or reading and writing information on one or more drives 180 such as HDDs, SDDs or a combination thereof, but in any case the drives 180 are understood to be e.g. tangible computer readable storage mediums that may not be transitory signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Furthermore, the system 100 may include a Bluetooth and/or Bluetooth low energy (BLE) communication element 191 for communicating with other devices using Bluetooth communication protocols, a near field communication (NFC) element 193 for communicating using NFC protocols, a code reader 195 for scanning and/or reading codes such as e.g. bar codes and quick response (QR) codes, and a GPS receiver 196 that is e.g. configured to receive geographic position information from at least one satellite and provide the information to the processor 122. However, it is to be understood that another suitable position receiver other than a GPS receiver may be used in accordance with present principles to e.g. determine the location of the system 100. Still further, the system 100 may include at least one camera 197 for gathering one or more images and providing input related thereto to the processor 122. The camera may be, e.g., a thermal imaging camera, a digital camera such as a webcam, a three-dimensional (3D) camera, and/or a camera integrated into the system 100 and controllable by the processor 122 to gather pictures/images and/or video.

Still in reference to FIG. 1, the system 100 may also include at least one motion sensor 198 such as e.g. a gyroscope for e.g. sensing and/or measuring the orientation of the system 100 and providing input related thereto to the processor 122, an accelerometer for e.g. sensing acceleration and/or movement of the system 100 and providing input related thereto to the processor 122, and/or an inertial sensor such as e.g. an "all-in-one" sensor itself comprising at least e.g. an accelerometer and a gyroscope for e.g. sensing acceleration and/or movement of the system 100 and providing input related thereto to the processor 122. Moreover, in some embodiments the system 100 may include at least one vibration element 199 that may be and/or include e.g. a motor for moving an eccentric weight of the vibrating element to generate a vibration at the system 100.

Though not shown in FIG. 1, it is to also be understood that the system 100 may include an audio receiver/microphone providing input to the processor 122 e.g. based on a user providing audible input to the microphone.

Figure 2:
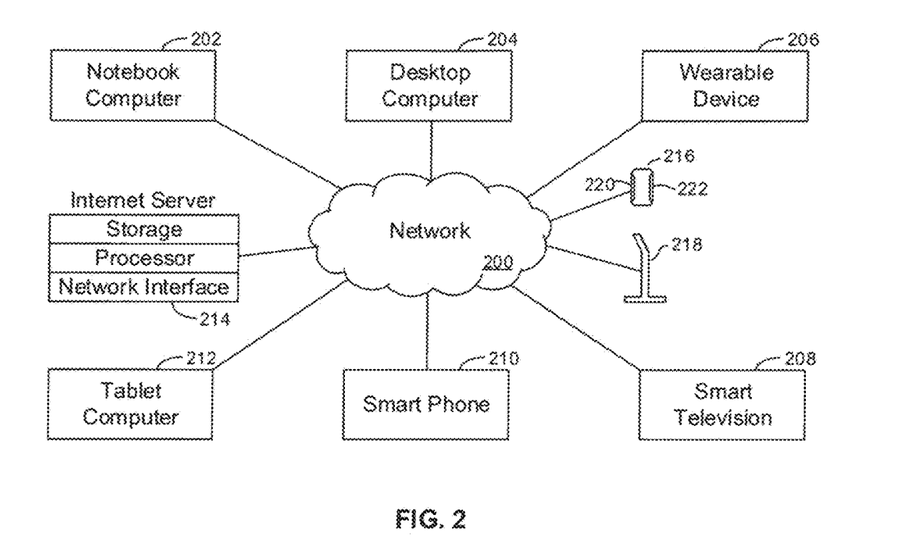
FIG. 2 is a block diagram of a network of devices in accordance with present principles.

Before moving on to FIG. 2, it is in be understood that an example client device or other machine/computer may include fewer or more features than shown on the system 100 of FIG. 1. In any case, it is to be understood at least based on the foregoing that the system 100 is configured to undertake present principles.

Turning now to FIG. 2, it shows example devices communicating over a network 200 such as e.g. the Internet in accordance with present principles. It is to be understood that e.g. each of the devices described in reference to FIG. 2 may include at least some of the features, components, and/or elements of the system 100 described above. In any case, FIG. 2 shows a notebook computer 202, a desktop computer 204, a wearable device 206 such as e.g. a smart watch, a smart television (TV) 208, a smart phone 210, a tablet computer 212, a portable hand-held apparatus for emitting (e.g., responsive to receipt of a wireless signal) an audible, visual, and/or tactile (e.g. pagular) output (e.g. such as a pager) 216 (referred to herein as a "pager" for simplicity), and a kiosk 218. As shown in FIG. 2, the pager 216 may include side elements 220 and 222 which may comprise e.g. lights such as light emitting diodes (LEDs) and/or vibration elements that may be and/or include e.g. a motor for moving an eccentric weight of the vibrating element to generate a vibration at the respective side of the pager 216 at which the respective vibrating element is disposed. FIG. 2 also shows a server 214 such as e.g. an Internet server that may e.g. provide cloud storage accessible to the devices 202-212, 216, and 218. It is to be understood that the devices 202-218 are configured to communicate with each other e.g. directly and/or on an ad-hoc basis (e.g. in so-called "Internet of Things" environments comprising things such as beacons and receivers as discussed herein), and/or over the network 200 to undertake present principles. Accordingly, it is to be understood that embodiments in accordance with present principles are not to be limited to the devices shown in FIG. 2 and may include e.g. devices running real-time operating systems including, but not limited to, Tizen, Contiki, RIOT, and Mbed and/or devices communicating using protocols such as, but not limited to, WiFi-Direct, ZigBee, and Thread.

Figure 3:
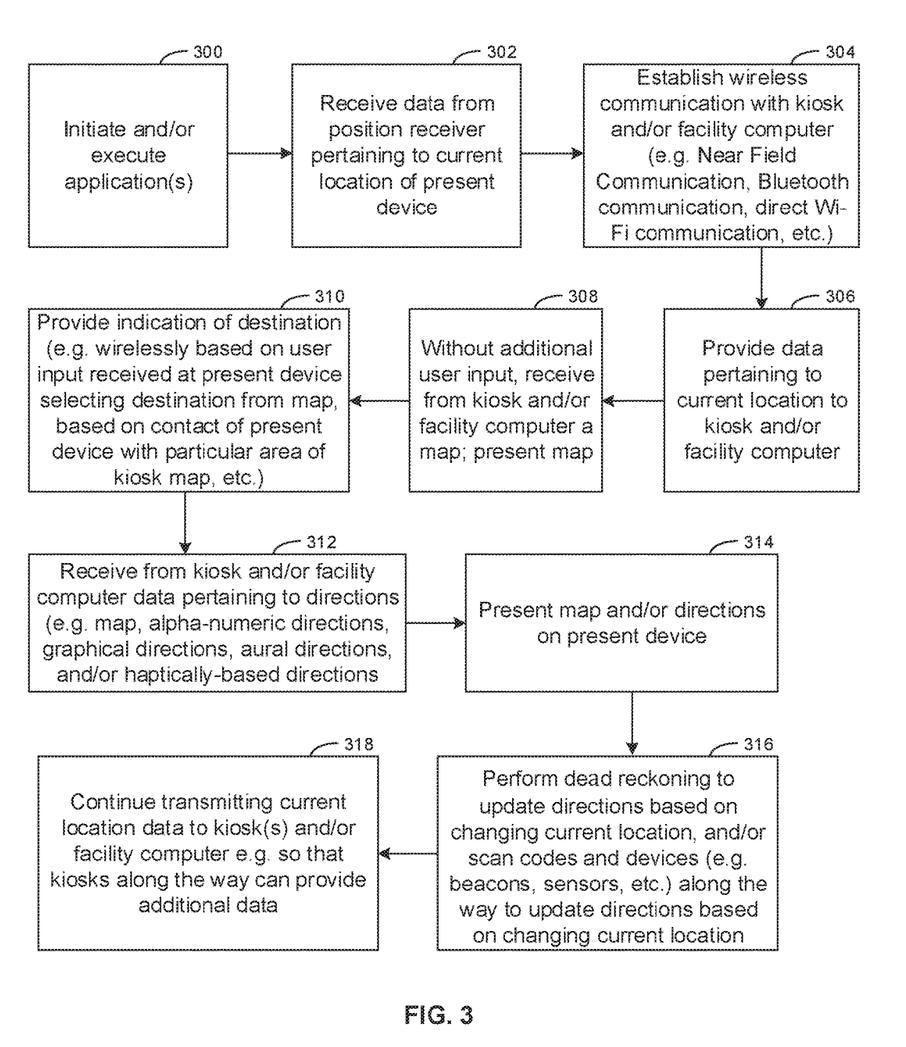
FIGS. 3-5 are flow charts showing example algorithms in accordance with present principles.

Referring to FIG. 3, it shows example logic that may be undertaken by a device such as the system 100 in accordance with present principles (referred to in the description of FIG. 3 as the "present device"). Beginning at block 300, the logic initiates and/or executes one or more applications for undertaking present principles. The logic then moves to block 302, where the logic receives data from a position receiver (e.g. GPS receiver) on the present device pertaining to a current location (e.g. based on GPS coordinates) of the present device. From block 302 the logic proceeds to block 304, where the logic establishes wireless communication with at least one kiosk in a facility/complex and/or at least one facility computer in the facility/complex. The logic may do so at block 304 e.g. either automatically without user input (e.g. responsive to detecting a wireless network of the facility) and/or responsive to user input to establish wireless communication. Regardless, it is to be understood that the wireless communication may be, but is not limited to, NFC communication, Bluetooth communication and/or Bluetooth low energy (BLE) communication, Wi-Fi communication (e.g. direct Wi-Fi communication), etc.

After block 304 the logic proceeds to block 306 where the logic optionally provides data, using the wireless communication that was established at block 304, to the kiosk and/or facility computer pertaining to the current location of the present device. Note that while such data may be provided at block 306 in some embodiments, it need not necessarily be provided in other embodiments where e.g. the kiosk and/or facility computer determines the location of the present device based on its own location (e.g. at the only public entrance to the facility where the present device also would be when it enters and connects wirelessly), a signal strength of a transmission from the present device, etc. In any case, and without additional input from a user (e.g. subsequent to the present device establishing the wireless communication), at block 308 the logic receives from the kiosk and/or facility computer at least a portion of at least one map of the facility and presents the at least portion of the map on a display of the present device.

From block 308 the logic moves to block 310. At block 310 the logic provides an indication to the kiosk and/or facility computer of a desired destination of the user in the facility. The indication may be provided at block 310 to the kiosk and/or facility computer e.g. wirelessly responsive to user input received at the present device selecting a particular area and/or location on the map presented on the present device, and/or based on physical contact of the present device with the particular area and/or location as represented on a map on the kiosk and/or facility computer itself (e.g. presented on a display of the kiosk and/or facility computer, and/or an electronic map disposed on a surface of the kiosk and/or facility computer). Thus, it is to be understood that touch-to-exchange NFC data transfers and/or tap-to-exchange NFC data transfers may be used in accordance with present principles.

Still in reference to FIG. 3, from block 310 the logic moves to block 312, where the logic receives from the kiosk and/or facility computer date pertaining to directions to the destination. For instance, at block 312 the logic may receive data including a (e.g. different and/or altered) map (e.g. to highlight the directions and/or destination), alpha-numeric directions, graphical directions, other visual directions, direction to be presented aurally, and/or directions to be presented haptically (e.g. by generating vibrations at the present device using a vibration element such as the element 199 described above).

Responsive to receiving the data at block 312, the logic moves to block 314 where the logic presents at least some of the data on the present device, such as e.g. the map and/or directions. The logic may then at block 316 begin tracking movement of the present device to update and/or alter the directions as the present device changes location while the user holds the present device and follows the directions presented thereon. Movement may be tracked e.g. based on input from a GPS transceiver on the present device, based on input from at least one motion sensor on the present device to perform inertial navigation (e.g. so-called "dead reckoning") at the present device, and/or based on the present device sensing and/or reading codes (e.g. barcodes, quick response (QR) codes), sensors, and/or Bluetooth beacons along the way to the destination.

Describing inertial navigation in more detail, various methods may be used such as e.g. the present device using acceleration data from an inertial sensor on the present device to track the acceleration of the present device to thus determine movement of the present device toward or away from e.g. an initial location such as at or near the entrance to the facility and/or an origination point for the directions within the facility. Thus, using the initial location, the present device may track movement e.g. in three dimensions such that it tracks the present device moving X meters in one direction, Y meters in a second direction, and Z meters in a third direction. In some embodiments, this data may be used in combination with GPS data and/or received signal strength indication (RSSI) data to further ascertain and/or confirm the position of the present device e.g. relative to the initial location.

Note that the logic of FIG. 3 may, after block 316, move to block 318. At block 318 the logic may continue exchanging data with one or more of the facility kiosks and/or facility computers, such as e.g. transmitting current location data pertaining to the present device to a kiosk or facility computer as the present device's current location changes e.g. so that the kiosk and/or facility computer, and/or an administrator thereof, may use the transmitted current location data to provide still other data and/or track the progress of the present device as the directions are followed.

Figure 4:
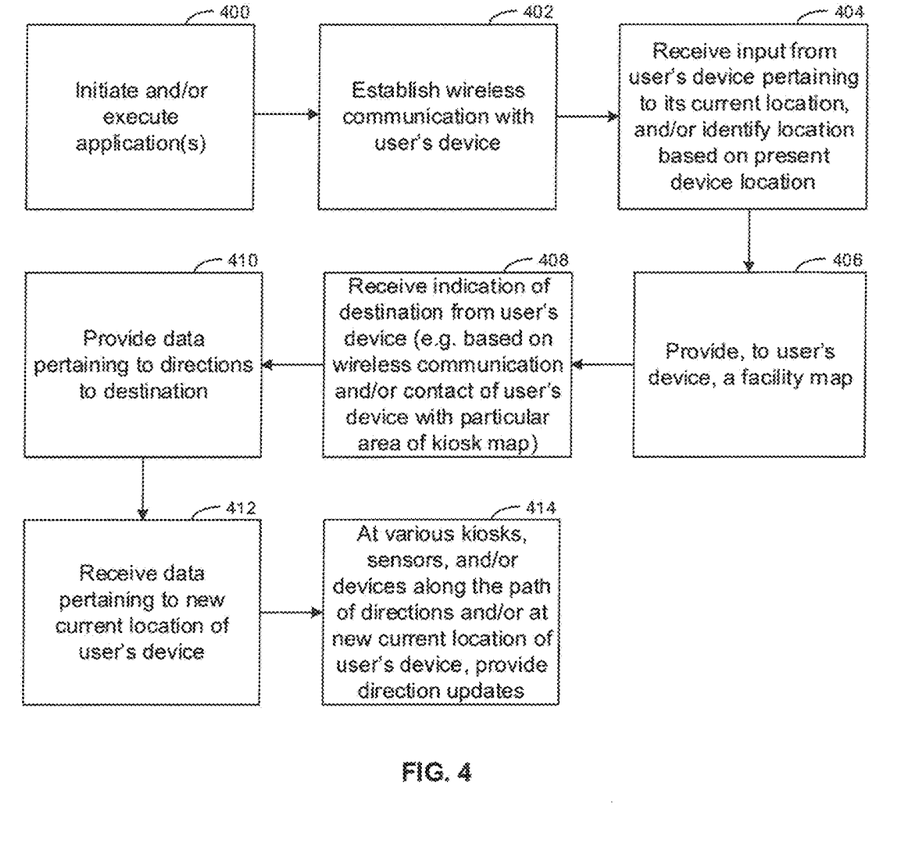

Now in reference to FIG. 4, it shows example logic that may be undertaken by a facility kiosk and/or facility computer in accordance with present principles (referred to in the description of FIG. 4 as the "present device"). Beginning at block 400, the logic initiates and/or executes one or more applications for undertaking present principles. The logic then moves to block 402, where the logic establishes wireless communication with another device (referred to in the description of FIG. 4 as the "user's device") which may be e.g. undertaking the logic of FIG. 3 described above. Thus, such wireless communication may be, but is not limited to, NFC communication, Bluetooth communication, and/or Bluetooth low energy (BLE) communication, Wi-Fi communication (e.g. direct Wi-Fi communication), etc.

After block 402 the logic moves to block 404, where the logic receives data from the user's device pertaining to the location of the user's device. In addition to or in lieu of that, but also at block 404, the logic may identify the location of the user's device based on the location of the present device itself to infer the location of the user's device based thereon. Responsive to receipt and/or identification of the location of the user's device at block 404, the logic moves to block 406 where it provides, to the user's device, at least a portion of a map of the facility (e.g. a map of the entire facility, or but a portion of a map of the entire facility where the portion comprises at least the current location of the user's device). After block 406 the logic moves to block 408 where it receives and/or identifies input indicating a destination for which directions should to provided to the user's device. The logic may receive and/or identify the input based on e.g. wireless transmission of such input from the user's device (e.g. based on a touch selection to the display of the user's device of a destination presented on the map as presented on that display, and/or based on a selection from a drop-down menu associated with the map that is also presented that display), and/or based on physical contact of the present device with the user's device at a particular area, and/or location of a map on the present device (e.g. electronically-based physical map being disposed on the present device, and/or a map presented on a touch-enabled display of the present device).

Responsive to receiving the input at block 408, the logic moves to block 410 where it provides data to the user's device comprising at least partial directions to the destination. The logic may have determined directions to provide to the user's device e.g. by analyzing facility structure and layout data, identifying the origination point for the user and the destination, and then identifying based on the facility structure data the shortest distance and/or fastest way a human is able to travel to the destination (e.g. through hallways, doors, and open spaces but not through walls).

After block 410, the logic moves to block 412 where the logic receives data (e.g. from the user's device, from a sensor in communication with the user's device, from a beacon in communication with the user's device, from another kiosk and/or facility computer in communication with the user's device, etc.) pertaining to a new current location at a later time of the user's device as the user takes the user's device with them while they follow the directions. The logic may then optionally proceed to block 414, where the logic at various other places in the facility (e.g. such as kiosks, sensors, beacons, and/or other facility computers along the path of the directions and/or at a new current location of the user's device) may transmit to these other places and/or otherwise cause to be presented at these other places direction updates based on the new current location of the user's device.

Continuing the detailed description in reference to FIG. 5, it shows example logic that may be undertaken by a device such as a portable hand-held one which emits (e.g. responsive to receipt of at least one wireless signal) an audible, visual, and/or tactile (e.g. pagular) output (such as e.g. a pager and thus referred to below as a "pager" for simplicity) in accordance with present principles comprising at least some of the components described above is reference to the system 100. Beginning at block 500, the logic initiates and/or executes one or more applications for undertaking present principles. The logic then moves to block 502, where the logic receives data pertaining to directions to a destination to be provided by and at the pager. The data may be received at block 502 from e.g. a facility base terminal and/or pager station, facility kiosk, and/or facility computer which wirelessly communicates with the pager to exchange data therewith, where the directions and/or the destination may have been input to the facility base terminal by e.g. a facility administrator to assist a user to which the pager will be given with reaching the destination.

Based on the data received at block 502, the logic at block 504 provides directions to the destination by actuating e.g. light emitting diodes (LEDs) (e.g. green LEDs for correct turns, red LEDs for wrong turns leading away from the destination) and/or causing vibrations at particular areas and/or points along a perimeter of the pager. Thereafter, the logic moves to block 506 where the logic uses a reader on the pager (e.g. a QR code reader) to read codes and/or other data along the way to the destination when the reader is actuated by the user and/or controlled by the user e.g. to read codes disposed at different surfaces in the facility as the user follows the directions. Then at block 508 the logic uses the data that was read to identify and/or provide additional directions to the destination at the pager. Accordingly, by scanning such codes using the pager at various places as the user follows the directions and then being provided with new, different, and/or additional directions by the pager as the user continues to scan such codes, the user may confirm they are traveling in the correct direction to reach their destination.

Figure 5:
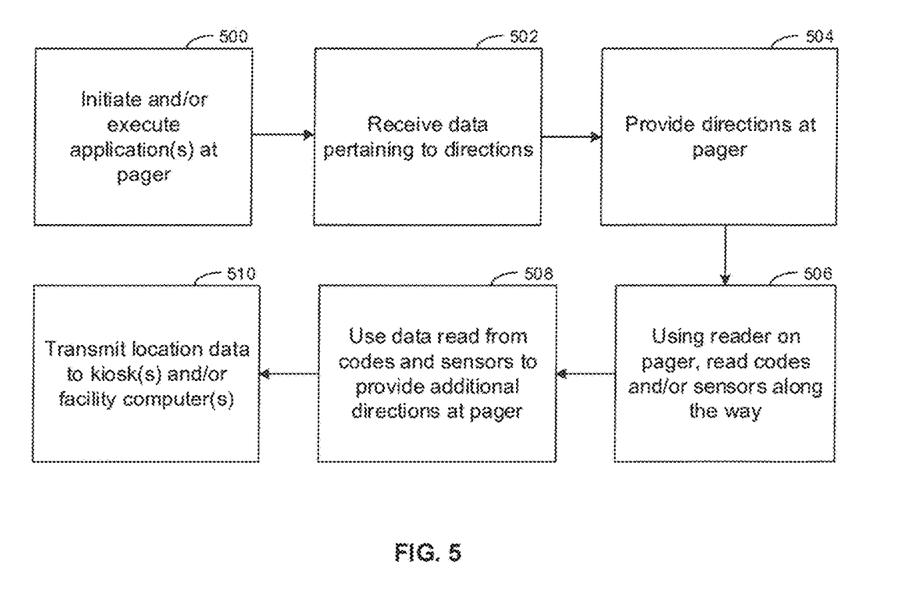

Still in reference to FIG. 5, it is to be understood that in some embodiments the logic may continue to block 510 where the logic transmits the location of the pager (e.g. identified based on the reading of codes discussed above) to the facility base terminal, facility kiosk, and/or facility computer so that e.g., a facility administrator can track the user's progress following the direction and/or to ascertain at least an approximate location of the pager.

Figure 6:
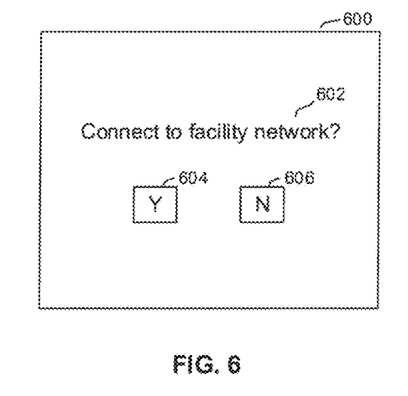
FIGS. 6-9 show example user interfaces (UI) in accordance with present principles.

Moving on, FIG. 6 will now be described. FIG. 6 shows a user interface (UI) 600 presentable on a display of a device such as the system 100 described above. The UI 600 comprises a prompt 602 for whether to connect the device presenting the UI 600 to a facility's network, which is understood to have been detected by the device when at least in proximity to the facility. Thus, a yes selector element 604 and a no selector element 606 are shown which are respectively selectable to (e.g. automatically without further user input) configure the device to connect to and communicate over the facility's network, or decline to do so.

Figure 7:
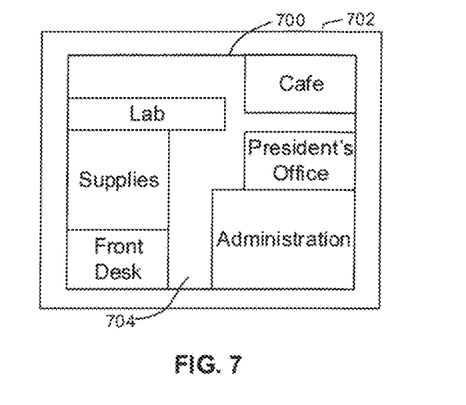

FIG. 7 shows an example map 700 of the facility presented on a display 702 of a device such as the system 100, it being understood that the map 700 may be received from a facility kiosk and/or facility computer and presented on the display 702 after a user selects e.g. the element 604 from the UI 600 to thus configure their device to communicate over the facility's wireless network with the facility kiosk and/or facility computer. It may be appreciated from FIG. 7 that the map 700 is a representation, diagram and/or blueprint of at least a portion of the facility and indicates thereon the titles and/or types of particular respective rooms shown on the map 700. It may also be appreciated from FIG. 7 that the map 700 includes a representation of a hallway 704 down which people may travel.

Note that while the map 700 above is described as being presented on a device such as the system 100 which may be e.g. a user's smart phone, it is to also be understood that the map 700 may be presented on the display of a facility kiosk and/or may be embodied in an electronic surface and/or touch-based capacitive surface of the kiosk. Regardless, it is to be understood that the map 700 in any of those forms may be selectable by a user to select a destination represented thereon (e.g. a particular area such as one of the rooms shown) to which a user wishes to travel, and hence receive directions thereto (e.g. based on the user touching the location with their finger, and/or based on the user touching the representation of the location, with their own device, on a touch-based map disposed on a kiosk to thus initiate the automatic transfer of directions to the location represented on the touched part of the map 700).

Figure 8:
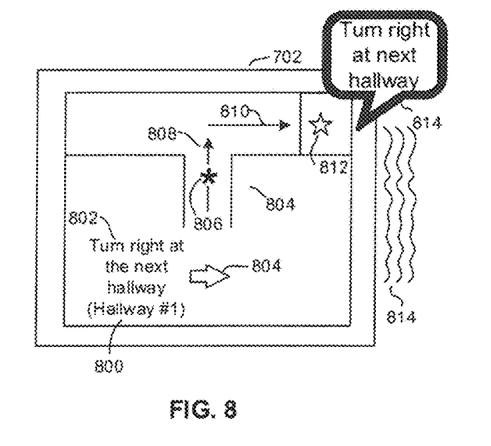

Accordingly, FIG. 8 shows an example of directions 800 (e.g. at least one step in the directions such as the next portion of directions the user is to follow after complying with a previous step in the directions) presented on the display 702 e.g. responsive to receipt of the directions from one of the facility's devices. Note that the example directions 800 include at least some instructions 802 presented in alpha-numeric form (e.g. "Turn right at the next hallway (Hallway #1)"), as well as some instructions 804 presented in graphical form. In the example shown, the graphical instructions include the right arrow shown on the bottom right portion of the directions 800, and the representation, of the hallway shown on the upper portion of the directions 800. Note that the asterisk 806 indicates in this graphic the current location of the user's device in the hallway, while the arrow 808 just above the asterisk 806 indicates the current direction the user's device (and hence the user) is traveling. Arrow 810 instructs the user to turn right at an upcoming junction of the hallway, and star 812 indicates the destination in the facility to which the user is traveling.

Still in reference to FIG. 8, also note that aural bubble 814 is understood to represent sound being emitted from the device comprising aural directions leading to the destination, and thus also corresponds to the next portion of directions the user is to follow. Thus, in the present example, the aural directions indicate in English that the user should "Turn right at the next hallway" to continue traveling toward the destination.

Last, note that in some embodiments, the device comprising the display 702 may provide haptic directions and/or cues such as e.g. vibrations to indicate a change in direction of travel of the device which is to occur next (e.g. which corresponds to the next portion of directions the user is to follow). The device may comprise e.g. plural vibration elements at one or more locations on the device (e.g. front, back, left, right, top and bottom sides) which may be selectively activated to vibrate in a direction in which the user is to turn next to continue following the directions. Thus, in the example shown, vibration waves 814 represent vibrations from the device that may be sensed by the user when holding the device and which originate and/or emanate from a right side of the device relative to looking upright at the directions as shown to thus indicate that the user should turn right at the next opportunity.

Figure 9:
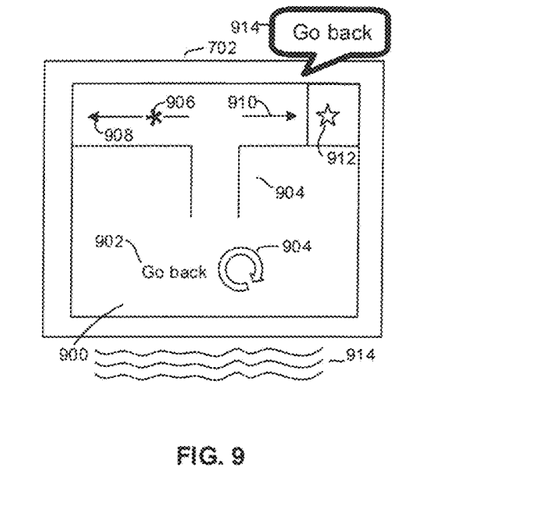

Moving on to FIG. 9, it shows an example of directions 900 (e.g. a subsequent step in the directions relative to the step shown in FIG. 8) presented on the display 702 e.g. responsive to a determination (e.g. by the device, a facility computer, and/or a facility kiosk) that the previous step in the directions was not correctly followed. In this case, rather than the user turning right at the hallway junction as be or she was instructed to do, the user instead turned left. Thus, the example directions 900 include at least some instructions 902 presented is alpha-numeric form (e.g. "Go back"), as well as some instructions 904 presented in graphical form. In FIG. 9, the graphical instructions include a U-turn arrow shown on the bottom left portion of the directions 900, and the representation of the hallway shown on the upper portion of the directions 900. Note that the asterisk 906 indicates in this graphic the current location of the user's device in the hallway, while the arrow 908 to the left of the asterisk 906 indicates the current direction the user's device (and hence the user) is traveling. Arrow 910 instructs the user on the proper direction to be traveling to reach the destination, indicated by star 912.

Furthermore, note that aural bubble 914 represents sound being emitted from the device comprising aural directions leading to the destination. Thus, in the present example, the aural directions indicate in English that the user should "Go back" e.g. in the opposite direction the user is currently traveling to continue toward the destination. Also note that the device comprising the display 702 may provide haptic directions and/or cues as discussed herein such as e.g. vibrations originating and/or emanating from a back side of the device relative to looking upright at the directions (e.g. as represented in FIG. 9 by vibration waves 914) to thus indicate that the user should turn and travel in the opposite direction they are currently traveling (e.g. the currently-traveled direction being the direction in which the front of the device is pointed when held in a user's hand with the display facing up toward the user's face to establish an at least substantially horizontal plane).

Before moving on to the description of other figures, it is to be understood that the directions shown in FIGS. 8 and 9 may, in addition to or in lieu of being presented on the user's device, be presented at kiosks the user encounters along the way responsive to e.g. the user's device physically contacting the kiosk (e.g. tap-to-exchange), and/or a particular kiosk automatically determining using wireless communication that the user's device is most proximate to that particular kiosk relative to other kiosks (e.g. based on map data and wifeless signal strength from the user's device) to thus present the directions on the kiosk so that the user may view them while they walk by it (e.g. without having to provide any input to the kiosk or their device when the particular kiosk becomes the most proximate kiosk to the user's device).

Figure 10:
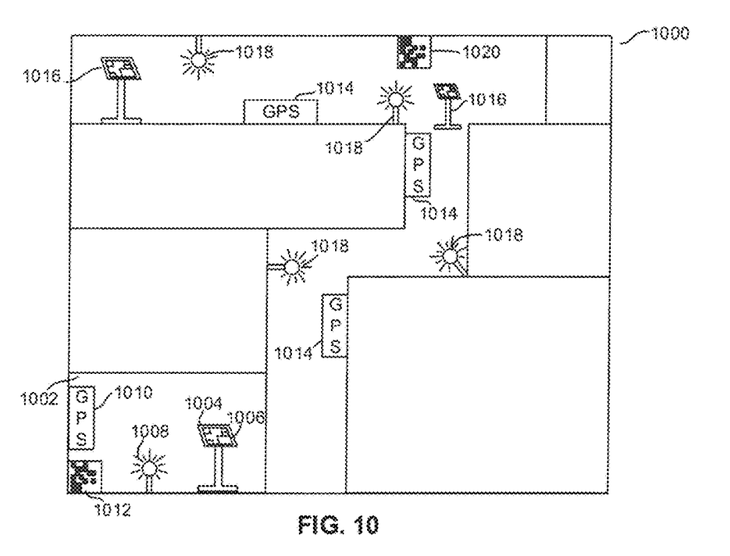
FIG. 10 is an example block diagram of a facility in accordance with present principles.

Continuing the detailed description is reference to FIG. 10, it shows a block diagram 1000 of at least a portion of the facility itself which was described in reference to FIGS. 7-9. As may be appreciated from FIG. 10, a front desk location and/or entrance 1002 includes at least one kiosk 1004 presenting a map 1006 thereon from which a user may select a destination for which to receive directions upon entering the facility in accordance with present principles. Also shown is at least one beacon 1008 (e.g. a Bluetooth low energy beacon) transmitting position information and/or data comprising maps and/or directions, all of which may be detected by a user's device.

At least, one position transceiver 1010 (e.g. a GPS position sensor) may also be included at the entrance 1002 to the facility, where the transceiver 1010 may also transmit position information and/or data comprising maps and/or directions, all of which may be detected by the user's device. Still further, at least one QR code 1012 may be disposed e.g. on a wall of the entrance 1002, where the QR code 1012 may be readable e.g. using a reader and/or camera on the user's device as well as using a pager as discussed herein. The QR code may be readable by a device (e.g. the user's device and/or pager) to identify the particular location in which the QR code is disposed, as well as e.g. to provide to the device reading it other position information, data comprising maps, and/or data comprising directions in accordance with present principles.

Moreover, though not shown for clarity, a pager base terminal and/or base station configured to wirelessly communicate with a pager may be disposed in the entrance 1002 to exchange data (e.g. calibration and/or destination data, and/or map data) with one or more pagers to be used by people to guide them to destinations within the facility. In some embodiments, a facility administrator may program each pager for a particular destination and then provide it to a user to guide them to the destination. The user may then return the pager upon exiting the facility.

As may be appreciated from FIG. 10, portions of the facility beyond the entrance 1002 may include additional position transceivers 1014 disposed therein, as well as other kiosks 1016 presenting portions of maps relative to and including the current position of the user's device and the particular kiosk. Also note that the facility may also include additional beacons 1018 and QR codes 1020. The elements 1014-1020 may also be used in accordance with present principles so that the device being earned by the user may "check in" and/or proximate (e.g. within a communicable distance) to them, acquire additional map and direction data therefrom, and/or confirm that the device is being carried in the proper direction toward the destination.

Figure 11:
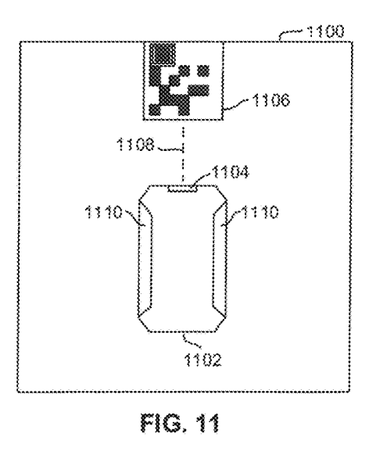
FIGS. 11 and 12 are example illustrations in accordance with present principles.

Reference is now made to FIG. 11. It shows an example illustration 1100 of a pager 1102 being used in accordance with present principles. The pager 1104 comprises a QR code reader 1104 which may scan a QR code 1106 (e.g. indicated by perforated line 1108) disposed on a wall of a facility. The reader 1104 may be actuated to scan for a QR code e.g. responsive to user input to the pager 1102 (e.g. the press of a button on the pager 1102).

Thus, suppose a user is following directions provided by the pager and/or needs to confirm that they are traveling in the correct direction toward their destination. The user may actuate the reader 1104 to scan the QR code 1106 disposed on a wall at a juncture of a hallway along the way to the destination (e.g. at a location in the facility other than the origination point), and be provided with feedback from the pager as to whether the QR code 1106 is along the way to the destination relative to the origination point or not to thus confirm whether the user is traveling the correct path to the destination and/or is following the directions correctly. In embodiments where mere confirmation is to be provided, e.g. a vibration and/or visual cue (e.g. actuation of one or more LEDs in a particular pattern) may be provided as such confirmation respectively using e.g. any and/or all vibration elements in the pager (not shown for clarity) to provide the vibration and using any and/or all LED elements 1110 to provide the visual cue.

Figure 12:
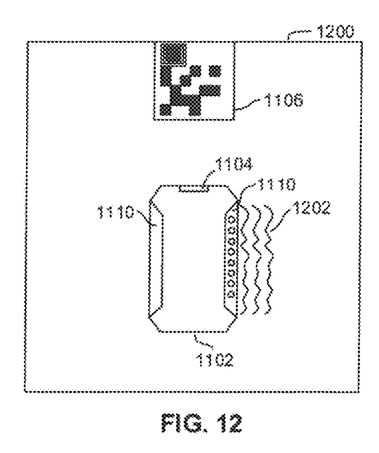

However, in embodiments where the pager is used to provide indications of directions in which to travel to continue traveling toward the destination, illustration 1200 of FIG. 12 shows that the pager 1102 may vibrate at a particular location of the pager 1102 to indicate and/or correspond to a direction to travel (e.g. for a next step in the directions). As may be appreciated from FIG. 12, responsive to reading the QR code 1106, the pager 1102 has illuminated LEDs on the right side of the pager relative to the pager being held upright in the user's hand to indicate that the user should travel right e.g. at the next possible place in the facility where they can turn right. Similarly, the pager 1102 provides vibrations originating and/or emanating from the right side of the pager (as represented by vibration waves 1202 in the illustration 1200) to provide another type of indication of the direction to travel next. Thus, if the QR code 1106 where disposed on a wall at the end of one hallway which connects to another hallway running orthogonal thereto, the user may scan the QR code 1106 and determine that they should turn right at that point based on the output from the pager (e.g. as opposed to turning left or going back down the hallway from which they came).

Without reference to any particular figure, it is to be understood that access points (e.g. beacons, sensors, etc.) as described herein may be used to assist a person with traveling to a destination within a building, complex, facility, piece of real property, etc. Though not specifically referenced above, radio frequency identification (RFID) tags separate from another device, or on the user's device, as well as at various locations around the facility may also communicate with each other to exchange information as disclosed herein. E.g. a user may be given a key card with an RFID tag in it rather than a pager, where the key card may be scanned at various kiosks along the way winch have RFID leaders. The kiosks, based on identifying the particular RFID tag as being associated with directions to a particular location (e.g. as configured by a facility administrator when the key card was provided to the user), each kiosk may present directions to the user's destination and/or present confirmation that the user is traveling the correct way.

Moreover, in some embodiments kiosks in a facility may coordinate with each other as well as with the other elements disclosed herein (e.g. beacons, sensors, and/or the user's device) to provide direction assistance to a user. E.g., beacons may track a user's device and the beacon may communicate the user device's location information to a facility computer and/or kiosk, which may in turn transmit feedback to the user's device regarding the directions. Thus, in one aspect, present principles employ central points along a travel path of a user to provide directions.

What's more, in some embodiments, unique QR codes may be generated by a facility kiosk and/or facility computer of a facility (e.g. a single building, a grouping of buildings at a location such as a college campus, etc.) to be associated with particular directions to be followed in a particular instance. The unique QR code may then be downloaded to the user's device, and the user may command the user's device to display it on its display screen at various points along the way so that it may be scanned by QR code readers on kiosks to inform the user of various things such as e.g. additional directions and/or confirmation that the user is traveling in the correct direction.

It may now be appreciated that present principles provide for e.g. a device for travelers to use to navigate unfamiliar places (e.g. hospitals, court houses, office buildings). The device can be programmed for a given destination. The device may act a guide while the user is traveling within a structure by offering supporting guidance like arrow indicators that light appropriately at intersections, and/or haptic feedback to indicate either a good or bad choice (e.g. when changing a direction of travel in the structure). The device may also communicate with sensors and beacons placed along the way, as well as by using dead reckoning and/or GPS technology. The pathway sensors and beacons can be Bluetooth tags which can communicate with e.g. low-cost "simple" transmitters (e.g. which may be reusable by the facility to provide different directions based on different user's desired destinations and returned to the facility upon each user's departure from the facility) that can be configured as needed to assist with providing directions to a user (e.g. to reflect current travel conditions in the area, temporary building modifications that may not be presented on a paper-based map such as repairs, or even permanent changes in building layout not reflected in such a paper-based map).

Furthermore, in some embodiments a device in accordance with present principles may be embodied in a physical "stand-alone" device (e.g. a pager), and/or may be embodied in a user's device such as a smart phone that has downloaded an application and/or data for undertaking present principles. Devices for undertaking present principles may also include e.g. a set of kiosks that can identify the traveler, e.g. by a Bluetooth tag and/or NFC tag carried by the traveler, etc., and thereby communicate the proper directions (e.g. at the kiosk) as the traveler come within a communicatable range of the tag with the kiosk.

What's more, in some embodiments indications of directions need not be limited to being presented on a single device. Direction indicators may be presented on the user's device, on the infrastructure of the building itself (e.g. a display mounted on a wall, a kiosk, etc.), and/or beamed to and presented on other (e.g. wearable) devices of the user such as smart glasses. Further still, directions may be provided based on scannable signage within the building, such as barcodes or QR codes, where the scan may e.g. initiate a transfer of the proper directions and/or updates to the directions.

The information sources upon which the directions are based can be many, including but not limited to e.g. building plans and layouts, crowd sourced information from other people's smart devices that travel through various (e.g. municipal) spaces, beacons placed along hallways, stairways and other infrastructure portals. Accordingly, even in buildings where the dimensions are not static (e.g. new rooms or areas are added) but may change, those changes may be input to the building's directional system for providing directions. Last, present principles also envision that such (e.g. crowd sourced) information can be used by building administrators for other purposes such, as e.g. building security, emergency response, building layout planning and design, etc.

Before concluding, it is to be understood that although e.g. a software application for undertaking present principles may be vended with a device such as the system 100, present principles apply in instances where such an application is e.g. downloaded from a server to a device over a network such as the Internet. Furthermore, present principles apply in instances where e.g. such an application is included on a computer readable storage medium that is being vended and/or provided, where the computer readable storage medium is not a transitory signal and/or a signal per se.

While the particular PROVIDING DIRECTIONS TO A LOCATION IN A FACILITY is herein shown and described in detail, it is to be understood that the subject matter which is encompassed by the present application is limited only by the claims.

What is claimed is:

1. A device, comprising:
    at least one processor; and
    storage accessible to the at least one processor and bearing instructions executable by the at least one processor to:
    receive data indicating a location of the device;
    receive, from a kiosk that has stored data pertaining to a destination in a building, information comprising directions to the destination in the building; and at least in part based on the information from the kiosk, present on the device at least one direction to the destination in the building;

wherein the destination is indicated by the device to the kiosk at least in part based on physical touching of the device with an area of a map on the kiosk which represents the destination.

2. The device of claim 1, wherein the instructions are executable by the at least one processor to:

send data indicating the location of the device to the kiosk.

3. The device of claim 1, comprising a code reader accessible to the at least one processor, and wherein the instructions are executable by the at least one processor to:

responsive to reading a code using the code reader, provide at least one direction to the destination.

4. The device of claim 3, wherein the code reader is a quick response (QR) code reader, and wherein the code is a QR code.

5. The device of claim 1, wherein the device communicates with the kiosk to indicate the destination using tap-to-exchange near field communication.

6. The device of claim 1, wherein the device communicates with the kiosk to indicate the destination based on device-to-device physical touching of the device physically against the kiosk.

7. The device of claim 1, wherein the instructions are executable by the at least one processor to:

haptically confirm that at least one of the directions has been followed.

8. A method, comprising:

receiving data indicating a location of a device;

receiving, from a kiosk that has stored data pertaining to destination in a building, information comprising directions to the destination in the building; and presenting, at least in part based on the information from the kiosk, on the device at least one direction to the destination in the building;

wherein the destination is indicated by the device to the kiosk at least in part based on physical touching of the device with an area of a reap on the kiosk which represents the destination.

9. The method of claim 8, comprising:

sending data indicating the location of the device to the kiosk.

10. The method of claim 8, wherein the device comprises a code reader, and wherein the method comprises:

using the device and responsive to reading a code using the code reader, providing at least one direction to the destination.

11. The method of claim 10, wherein the code reader is a quick response (QR) code reader, and wherein the code is a QR code.

12. The method of claim 8, wherein the device communicates with the kiosk to indicate the destination using touch-to-exchange near field communication.

13. The method of claim 8, wherein the device communicates with the kiosk to indicate the destination based on device-to-device physical touching of the device physically against the kiosk.

14. The method of claim 8, comprising:

haptically confirming that at least one of the directions has been followed.

15. A computer readable storage medium (CRSM) that is not a transitory signal, the computer readable storage medium comprising instructions e Tumble by at least on processor of a device to:

receive data indicating a location of the device;

receive, from a kiosk that has stored data pertaining to a destination in a building, information comprising directions to the destination in the building; and at least in part based on the information from the kiosk, present on the device at least one direction to the destination in the building;

wherein the destination is indicated by the device to the kiosk at least in part based on physical touching of the device with an area of a map on the kiosk which represents the destination.

16. The CRSM of claim 15, wherein the instructions are executable by the at least one processor to:

send data indicating the location of the device to the kiosk.

17. The CRSM of claim 15, wherein the device comprises a code reader accessible to the at least one processor, and wherein the instructions are executable by the at least one processor:

responsive to reading a code using the code reader, provide at least one direction to the destination.

18. The CRSM of claim 17, wherein the code reader is a quick response (QR) code reader, and wherein the code is a QR code.

19. The CRSM of claim 15, wherein the device communicates with the kiosk to indicate the destination using touch-to-exchange near field communication.

20. The CRSM of claim 15, wherein the device communicates with the kiosk to indicate the destination based on device-to-device physical touching of the device physically against the kiosk.

* * * * *